Dec. 16, 1969  E. SACHS  3,484,033
TOOL FOR REMOVING SOLDER
Filed Sept. 11, 1967
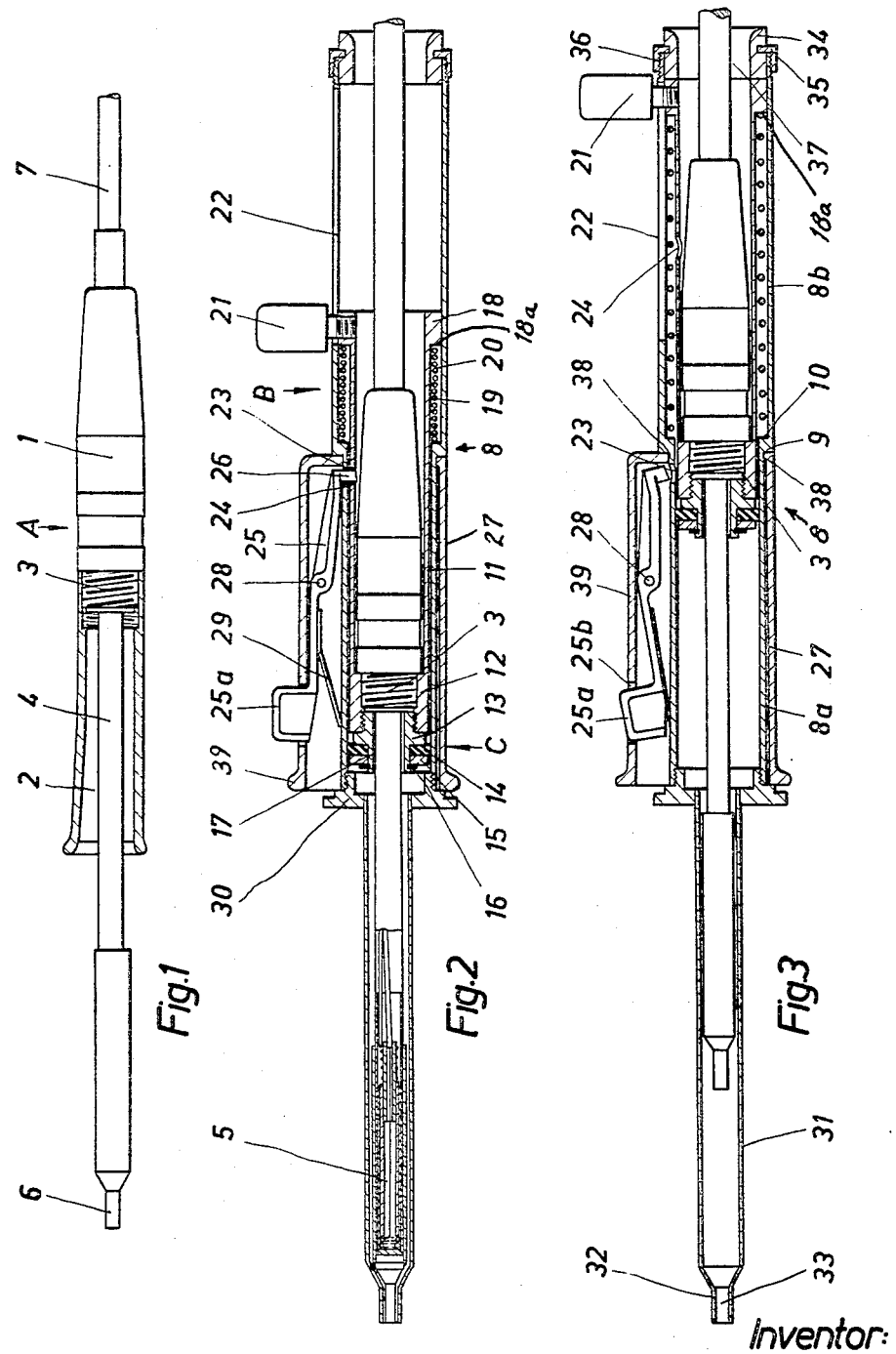
Inventor:
ERNST SACHS
BY McGlew and Toren
ATTORNEYS United States Patent Office 3,484,033
Patented Dec. 16, 1969

3,484,033
TOOL FOR REMOVING SOLDER
Ernst Sachs, Wertheim (Main), Germany, assignor to
ERSA Ernst Sachs KG, Wertheim (Main), Germany
Filed Sept. 11, 1967, Ser. No. 666,803
Claims priority, application Germany, Sept. 13, 1966,
E 24,024; Mar. 22, 1967, E 33,649
Int. Cl. B23k 1/00
U.S. Cl. 228—51                                    10 Claims

ABSTRACT OF THE DISCLOSURE

A tool for removing solder comprised of a heating means for heating the solder and a suction means for removing the solder after it has been adequately melted. The tool is formed of a piston chamber containing a movable piston member and a tubular member containing the solder heating means extending from one end of the piston chamber. Latching means are provided in the piston chamber for securing the piston member in a first position. In addition, a spring member is provided in the chamber for moving the piston to a second position when the latch means are released. The end of the tubular member spaced from the piston chamber forms a nozzle and the heating means are movable into this nozzle when the piston is latched in its first position. After the solder to be removed has been melted, the latching means are released and the piston moves from its first to its second position, away from the nozzle of the tubular member, causing a suction action for drawing the melted solder into the tubular member.

Background of the invention

This invention is directed to a tool for removing solder and, more particularly, to a tool which combines the elements for heating and removing the soldered material into a small-sized unit. This tool is easy to handle, and it can be inserted into small areas from which solder is to be removed.

This invention is directed to a de-soldering tool, that is, a tool for removing solder from a surface. De-soldering tools have been known in the past and have employed separate elements for heating the material to be removed and for creating suction and removing the liquid solder.

One de-soldering tool which has been employed includes a hand nozzle connected by a pipe line to a hollow rubber ball-like member for providing the suction necessary for removing the solder through the nozzle. Such de-soldering devices are too bulky to reach many of the small and hard to reach places where it is necessary to remove solder and, further, it is often difficult to hold them in position during use. Additionally, the suction action created by the rubber member is often insufficient to remove all of the liquid solder.

Another type of de-soldering tool which has been used in the past employs a compression spring in combination with a pump piston to produce the necessary suction for the removal of the liquid solder. These devices, however, do not include the heating means necessary to liquefy the solder prior to its removal. Before such a solder removal member may be used, the solder has to be heated by a separate soldering iron or similar tool. It then becomes necessary to use two separate instruments, the soldering iron and the suction instrument for the removal of the solder. There is a considerable disadvantage in such equipment, for example, it is difficult to handle since both hands of the operator are employed in removing the solder.

Additionally, tools have been used which can be employed both for soldering as well as for de-soldering. In such devices, the head of the soldering iron, which is made of copper, has a passageway connected to the vacuum chamber in a pump cylinder. The hollow tip of the soldering iron is heated by an external electric heating element which can be arranged in either of two ways, by placing the heating element about the soldering tip or by spacing the heating element apart from the tip and connecting it by a heat conductor. These instruments are inconvenient to use or complicated in their construction and because of their size, it is often difficult to reach small and relatively inaccessible places.

Summary of the invention

Accordingly, it is a primary object of the present invention to overcome these disadvantages of the prior art devices by providing a de-soldering device which combines a thin soldering iron with a solder removal attachment which overcomes any problems of accessibility in removing solder from small and/or difficult to reach places and which also provides means for effecting a quick de-soldering operation.

Therefore, in the present invention, a tool for removing solder is comprised of an elongated piston chamber having a small diameter tubular member in axial alignment with and extending from one end of the piston chamber. At its end remote from the piston chamber, the tubular member has a nozzle of reduced size. A piston member is located within the piston chamber and is guided between a first latched position and a second unlatched position by means of a tubular guide member. A heating element, such as a soldering iron extends through the piston chamber having its forward end positionable within the tubular member. Part of the soldering iron intermediate its ends acts as the piston member. With the piston in its latched position at one end of the piston chamber, the soldering iron is located within the nozzle opening of the tubular member and provides heat to soldering material to be removed. After the soldering material is adequately melted, the piston is unlatched from its first position and, by means of a compression spring, it is moved to its second position at the other end of the piston chamber. The movement of the piston through the piston chamber provides a suction effect for removing the liquid soldering material through the nozzle in the tubular member.

Since the heating element and the de-soldering element are combined into one device, because of the small size, the device is easy to manipulate, and due to the small diameter of the tubular element within which the heating element is contained the device can be inserted in relatively small places from which solder is to be removed. Additionally, the heat generated by the soldering iron within the tubular member prevents the nozzle of the tubular member from becoming blocked by solder. Moreover, when the soldering iron is positioned within the nozzle of the tubular element, it can also be used for soldering as well as for melting and removing soldering material.

The guide member contained within the piston chamber assures the proper alignment of both the piston and the soldering iron so that it can be properly disposed in the nozzle of the tubular member when the piston is located in its latched position. The guide member also provides means for easily securing the piston assembly in sealed arrangement within the pump chamber. Due to the arrangement of the guide member, a small washer can be easily assembled on the piston assembly to provide a sealing means between the piston and the wall of the piston chamber.

The outside diameter of the guide member is such that it can be easily moved through the piston chamber. At its rear end, the guide member has a bushing which engages the wall of the piston chamber in sliding relationship whereby it is properly guided through the chamber but is not exposed to any bending action.

The outside surface of the guide member is spaced from the inside surface of the rear portion of the piston chamber forming an annular passageway containing the compression spring which returns the piston to its second position. The separate space for the compression spring prevents any interference between the spring and the piston located within the guide member.

The bushing at the rear end of the guide member provides a bearing surface for one end of the compression spring. This bearing surface compresses the spring when the piston is moved into its latched position. A grip member is connected to the guide bushing and extends exteriorly of the piston chamber. The grip member is movable through a slot in the piston chamber wall for sliding the guide member and the piston into the latched position, and at the same time compressing the spring. When the piston is in its first position, a latching member extends through an opening in the guide member and holds the piston in position against the return action of the compression spring. When the latch member is released by depressing a latch button, the compression spring drives the guide member and the piston into its second position and causes a suction action for removing the soldering material through the nozzle of the tubular member. At the end of the piston chamber a shock absorber is provided to take up the recoil action of the guide member as it returns the piston to its second position.

Handling of the de-soldering tool is simplified by the arrangement of the latch button and the means for positioning the piston in its latched position. The button is centered in the handle grip of the tool in such a manner that it is aligned with the locking pawl which secures the piston in position.

The tubular member which provides the de-soldering nozzle for the device is secured to the piston chamber by means of a threaded ferrule. The tubular member can be easily removed and cleaned of any soldering residues which it contains by unscrewing it from the threaded ferrule.

To limit heat loss from the tubular member containing the soldering iron, the member is made of a material which is a comparatively poor heat conductor, such as steel. Additionally, due to the small diameter of the tubular member and its nozzle, it provides easy insertion into small and relatively inaccessible places where soldering material has to be removed. Due to its small size, this de-soldering tool is particularly advantageous in removing materials from printed circuits which are often placed very close together.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Brief description of the drawings

FIG. 1 is a side view, partly in section, of a heating element employed in the de-soldering tool of the present invention;

FIG. 2 is a side view, partly in section, of a de-soldering tool embodying the present invention and containing the heating element of FIG. 1; and FIG. 3 is a side view, partly in section, similar to that shown in FIG. 2, however, with the heating element of the de-soldering tool displaced to the rearward position.

Detailed description of the invention

In FIG. 1, an elongated soldering iron A is shown comprised of a handle part 1 to which a handle cover 2 is secured at a threaded attachment section 3. Extending longitudinally from the handle is a pipe member 4 having an enlarged section near its outer end containing the heater element 5 and a reduced diameter soldering tip 6. A cable 7 for supplying power to the soldering element extends from the opposite end of the handle 1. The soldering iron shown usually works with a power supply of 200 volts, however, it can also be operated in the low voltage range at 6 volts.

As illustrated in FIG. 2, the small diameter soldering iron A is disposed within a de-soldering member B after its handle 2 is removed. It will be appreciated that the soldering iron A does not need a handle member when it is placed within the arrangement shown in FIG. 2.

The de-soldering member B comprises a piston chamber formed by an elongated cover member 8 divided into a front conduit member 8a and a rear conduit member 8b. The inside and outside diameter dimensions of front conduit member 8a are less than those of the rear conduit member 8b. At the juncture of these two conduit members, an annular flange 9 extends between the members and provides a shoulder 10 which faces away from the front conduit member 8a. The soldering iron A is inserted through the cover member 8 from the rear conduit member 8b into the front conduit member 8a and its attachment section 3 is threaded into the threaded portion 12 of a guide member 11. In the front end of the guide member 11, a threaded ferrule 13 is also tightly screwed into engagement with the threaded portion 12. Arranged transversely around the ferrule 13 and spaced from the guide member 11 is an annular washer 14 which extends from the ferrule into engagement with the walls of the conduit member 8a. The washer 14 is held in place on the ferrule by a disk 15 made of a synthetic material and a locking washer 16.

The ferrule 13, the washer 14, the synthetic disk 15 and the lock washer 16 in combination with the guide member 11 make up the pump piston C which rides through the piston chamber or cover member 8 secured to the forward end of the handle 1 of the soldering iron A.

A central passageway 17 is provided through the threaded ferrule 13 of a sufficient size to permit the passage of the soldering tip 6 and its pipe member 4. When the forward end of the soldering iron has been inserted through the passageway 17, the attachment section 3 of the soldering iron is secured within the guide member 11. With this assembly step completed, the narrow diameter soldering iron A and the pump piston C are united for combined movement through the piston chamber. At its forward end, that is, the left end as viewed in the drawings, the guide member 11 has a diameter substantially equal to that of the inside diameter of the conduit member 8a so that it will pass therethrough in sliding relationship. The guide member 11 has a uniform diameter for almost its entire length so that it is spaced from the inside wall of the rear conduit member 8b except at its rear end which has an increased diameter and forms a guide bushing 18. The guide bushing 18 has a diameter substantially equal to that of the inside diameter of the rear conduit member 8b so that it slides along the inside wall. The disposition of the guide member 11 within the piston chamber, supported at its rear end by the inner surface of the rear conduit member 8b bushing 18 and at its forward end by the inside wall of the front conduit member 8a, affords a very exact axial guide for the tip 6 of the soldering iron A attached to the guide member.

Located within the annular chamber formed between the outer surface of the guide member and the inner surface of the rear conduit member 8b is a compression spring 19, as shown in FIG. 3 the compression spring is in its relaxed or extended position while in FIG. 2 it is shown in its compressed position. At its forward end, the spring acts against the shoulder 10 of the flange 9 between the front conduit member 8a and the rear conduit member 8b and at its rear end the spring rests against the face 18a of the guide bushing 18. A grip member 21 is secured to the guide bushing 18 and is positioned within a longitudinally extending slot 22 in the wall of the rear conduit member 8b. By moving the grip member 21 forwardly through the slot 22 the guide member 11 and with it the piston assembly C and the soldering iron A is moved from the position shown in FIG. 3 to that shown in FIG. 2.

When the piston is moved from its rearward position as shown in FIG. 3 into the position in FIG. 2, because of the action of the spring tending to move it rearwardly, it is necessary to latch the guide member 11 and its attached assembly in place. A latch lever assembly 25 is positioned above the front conduit member 8a and has a locking pawl 26 which extends through both an opening 23 in the conduit member 8a and an opening 24 in the guide member 11 for locking the guide member in its latched position within the front conduit member 8a. A handle case 27 is located about the front conduit member 8a and provides a closure element 39 over the lever arm 25. At the opposite end of the lever arm from the locking pawl 26, a release button 25a on the lever assembly 25 extends through an opening 25b in the closure element 39. The lever arm is pin connected at 28 and a plate spring member 29 is positioned between the forward part of the lever arm and the outer surface of the front conduit member 8a for holding the button 25a in the position shown in FIG. 2 when the blocking pawl 26 is locked into the openings 23 and 24. When the release button 25a is depressed, see FIG. 3, the spring 29 is also depressed and the lever arm pivots about pin 28 lifting the locking pawl out of engagement with the openings 23, 24. With the guide member unlocked or unlatched, the spring 19 forces it rearwardly through the rear conduit member 8b.

The handle case 27 encircles the front conduit member 8a and is supported at its rear end against the flange 9 at the juncture between the front and rear conduit members 8a, 8b. The handle case 27 is locked and centered on the de-soldering tool by a pair of key surfaces 38 located on the outer surface of the piston chamber or cover member 3. At the other end of the handle case from the flange 9, a threaded ferrule 30 is secured into the forward end of the front conduit member 8a and holds the handle case in place. With the exception of the lever enclosure 39, the handle case 27 has the same outside diameter as the rear conduit member 8b.

The threaded ferrule 30 forms the forward end of the piston chamber 8 and a de-soldering pipe 31 is connected to the ferrule 30 and extends axially from piston chamber. The pipe member 4 of the soldering iron A rides through the de-soldering pipe 31 between the positions shown in FIGS. 2 and 3. The front end of the de-soldering pipe 31 has a reduced diameter section 32 providing a nozzle opening 33, the inner diameter of which is sufficiently large to receive the tip 6 of the soldering iron so that it extends through the pipe member 4 to the forward end of the nozzle 33.

During use the tip of the soldering iron is heated by the heating element 5 within the pipe member 4. When soldering material is to be removed from a surface, the soldering iron A and piston assembly C is moved forward through the piston chamber by means of the grip member 21 until it is locked in position in the front conduit member 8a by the latch arm 25. This position is shown in FIG. 2 with the soldering tip 6 located at the forward or nozzle end of the de-soldering pipe 31. In this position, heat from the tip 6 is directed to the soldering material and when it is melted, the release button 25a is depressed, the guide member 11 is released and the spring drives it rearwardly through the piston chamber. This rearward motion creates a suction action at the nozzle 33 of de-soldering pipe 31 causing the melted solder to be drawn through the nozzle 33 into the pipe 31. The solder which is drawn up into the pipe 31 will be expelled when the piston assembly and the soldering iron is again moved into its latched position as shown in FIG. 2.

To absorb the recoil of the guide member 11 and the piston assembly C as it is returned to its unlatched position by the compression spring 19, a rubber shock absorber 34 is positioned at the rear end of the rear conduit member 8b and acts as a stop for the guide bushing 18. The shock absorber is fastened to the rear conduit member 8b by means of a lock nut 35. The lock nut 35 has a right angled cross section with one leg extending into the shock absorber 34 and the other leg extending along the outer surface of the rear conduit member 8b and being secured to its threaded section 36. The power cable for the soldering iron A passes through an opening 37 in the shock absorber 34.

The heat required for melting the soldering material in the de-soldering operation is delivered from the tip 6 of the soldering iron which is positioned within the nozzle of the de-soldering pipe 31 when the piston is in its latched position. Any heat loss from the de-soldering tool is limited because the pipe 31 is made of a comparatively poor heat conductor and also because the pipe is thin walled. Due to the heat generated by the soldering iron A and the sliding action of its tip 6 through the nozzle 33 of the de-soldering pipe 31 both the tip and the nozzle are kept free of soldering material.

While a specific embodiment of the invention has been shown and described in detail to illustrate the application of the inventive principles, it will be understood that the invention may be embodied otherwise without departing from such principles.

What is claimed is:

1. A tool for removing solder comprising an elongated piston chamber, a piston disposed within said chamber and longitudinally positionable therethrough between a latched position and an unlatched position, means for locking said piston in its latched position, means for returning said piston to its unlatched position, a longitudinally extending small diameter tubular member in axial alignment with said piston chamber and having one end connected to said piston chamber and a nozzle end remote therefrom, and a small diameter longitudinally extending soldering iron axially positioned within and movably positionable through said tubular member between said nozzle end for supplying heat thereto and a position within said tubular member spaced from said nozzle end, whereby solder is heated and melted at said nozzle end and, upon releasing the piston from its latched position and returning it to its unlatched position, a suction action is developed within the tubular member and the melted solder is drawn into the tubular member.

2. A tool for removing solder, as set forth in claim 1, wherein said soldering iron forms a portion of said piston and is movably positionable through said tool with said piston.

3. A tool for removing solder, as set forth in claim 2, wherein said tubular member has a reduced diameter nozzle at its nozzle end and the tip of said soldering iron fits within and in closely fitting relationship with said nozzle at its nozzle end and the tip of said soldering iron 4. A tool for removing solder, as set forth in claim 1, wherein said piston chamber comprises a front conduit member connected to said tubular member and a rear conduit member in axial alignment with said front conduit member and spaced from said tubular member, a piston guide member disposed within said piston chamber and being movable therethrough between said front and rear conduit members, the outer surface of said piston guide member being spaced from the inner surface of said rear conduit member and forming therebetween an annular passageway, the rear end of said piston guide member having a bushing section of increased diameter arranged in sliding engagement with the inside wall of said rear conduit member, said means for returning said piston to its unlatched position comprising a helical compression spring disposed within the annular passageway between said piston guide member and said rear conduit member, an annular flange extending between and joining said front and rear conduit members and forming a shoulder at one end of said annular passageway which supports one end of said compression spring, and a shoulder on said bushing section of said guide member forming the opposite end of said annular passageway and supporting the opposite end of said compression spring.

5. A tool for removing solder, as set forth in claim 4, wherein a slot extends through said rear conduit member in parallel relationship with the longitudinal axis of the piston chamber, a grip member is secured to said bushing section of said guide member and extends through said slot wherein by moving the grip member through said slot the guide member and its attached piston can be moved from its unlatched position to its latched position with said compression spring being placed in a compressed condition within the annular passageway formed between the guide member and the rear conduit member.

6. A tool for removing solder, as set forth in claim 5, wherein a latch assembly located in a latch housing on the exterior of said front conduit member, said latch assembly comprising, a pivotal latch arm having a locking pawl at one end, an opening in said guide member arranged to register with said opening in said front conduit member and to receive said locking pawl when said guide member and said piston are positioned in latched position.

7. A tool for removing solder, as set forth in claim 6, wherein a depressable button member is disposed on the opposite end of said latch arm from said locking pawl and extends through an opening in said latch housing whereby upon depressing said button, the latch arm and the locking pawl are pivoted out of engagement and the guide member is released and returns with the piston into the rear conduit member.

8. A tool for removing solder, as set forth in claim 5, wherein a shock absorber is positioned at the rear end of said rear conduit member remote from the juncture of said front and rear conduit members and is arranged to be contacted by the bushing section on the end of said guide member when the piston is returned from its latched to its unlatched position.

9. A tool for removing solder, as set forth in claim 4, wherein a threaded member secures said soldering iron to said guide member, a seal washer is positioned between said threaded member and said inner surface of said front conduit member whereby the combination of said threaded member, seal washer, and soldering iron form said piston.

10. A tool for removing solder, as set forth in claim 7, wherein an insulated handle is disposed about the front conduit member of said piston chamber and includes said latch housing.

References Cited
UNITED STATES PATENTS 2,826,667   3/1958   Brillinger _____ 228—20
3,114,026   12/1963  Fortune _____ 228—20

JOHN F. CAMPBELL, Primary Examiner

R. J. CRAIG, Assistant Examiner

U.S. Cl. X.R.
228—20